J. RICHARDSON.
Thill-Coupling.
No. 219,020.   Patented Aug. 26, 1879.
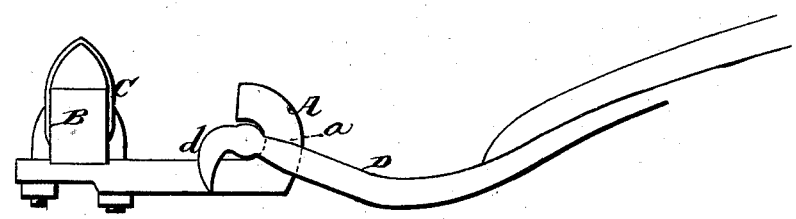
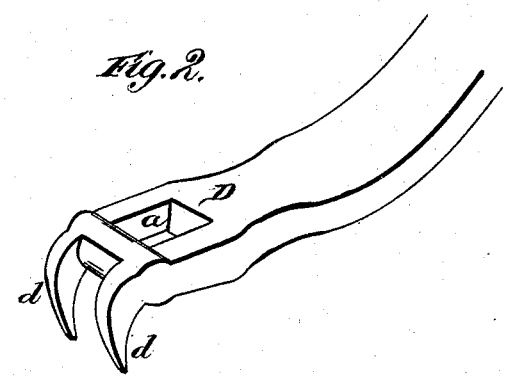
WITNESSES
Robert Everett
James J. Sheehy
INVENTOR.
John Richardson
Gilmore, Smith & Co.
ATTORNEYS

UNITED STATES PATENT OFFICE.

JOHN RICHARDSON, OF ANCASTER TOWNSHIP, WENTWORTH COUNTY, ONTARIO, CANADA.

IMPROVEMENT IN THILL-COUPLINGS.

Specification forming part of Letters Patent No. 219,020, dated August 26, 1879; application filed June 28, 1879.

*To all whom it may concern:*

Be it known that I, JOHN RICHARDSON, of Ancaster township, in the county of Wentworth, Province of Ontario, and Dominion of Canada, have invented certain new and useful Improvements in Thill-Couplings; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my thill-coupling, and Fig. 2 is a perspective view of the thill-iron.

The nature of my invention consists in a thill-coupling composed of a hook with a hole in the thill-iron fitting over the same, all constructed substantially as hereinafter more fully set forth.

The annexed drawings fully illustrate my invention.

A represents a strong hook firmly bolted onto the axle-tree B and bed-piece by a clip, C. D is the thill-iron, which is provided with a hole or slot, $a$, to fit over the hook A snugly. When this iron is in the position that it will be when on the horse, uncoupling is impossible, and when the horse is unhitched the shafts fall to the ground. There is no way for them to get loose except by raising them vertically.

On the rear end of the thill-iron D are formed claws $d\ d$, which lie one on each side of the shank of the hook A. These claws guide the iron onto the hook, and when the iron is in place they take hold on each side of the shank, which makes it bear more evenly on the hook and takes the strain off the front part of the hook in turning.

The coupling is very simple, and yet substantial and perfectly safe.

The hook may be made square or sloping on the point, as desired. By making it sloping the shafts need not be raised so high to get them on.

I claim—

The combination of the hook A, clip C, and the thill-iron D, having slot $a$ and claws $d\ d$, substantially as and for the purposes herein set forth.

In testimony that I claim the above I have hereunto subscribed my name in the presence of two witnesses.

JOHN RICHARDSON.

Witnesses:
W. S. GARROCH,
ROBERT FORSYTH.